US007092585B2

(12) United States Patent
Morita et al.

(10) Patent No.: US 7,092,585 B2
(45) Date of Patent: Aug. 15, 2006

(54) METHOD AND APPARATUS FOR PROCESSING BOTH STATIC AND MOVING IMAGES

(75) Inventors: Kenji Morita, Kawagoe (JP); Hitoshi Sato, Kawagoe (JP); Toshiyuki Murata, Kawagoe (JP); Yukari Mizumura, Kawagoe (JP); Rie Yamashita, Kawagoe (JP)

(73) Assignee: Pioneer Corporation, Tokyo-To (JP)

( * ) Notice: Subject to any disclaimer, the term of this patent is extended or adjusted under 35 U.S.C. 154(b) by 297 days.

(21) Appl. No.: 09/818,632

(22) Filed: Mar. 28, 2001

(65) Prior Publication Data

US 2001/0026646 A1 Oct. 4, 2001

(30) Foreign Application Priority Data

Mar. 31, 2000 (JP) ........................... P2000-099900

(51) Int. Cl.
*G06K 9/32* (2006.01)

(52) U.S. Cl. ...................................... 382/298; 382/305

(58) Field of Classification Search ................ 382/298, 382/305
See application file for complete search history.

(56) References Cited

U.S. PATENT DOCUMENTS

| | | | | |
|---|---|---|---|---|
| 4,197,590 A | 4/1980 | Sukonick et al. | ........... | 345/781 |
| 4,769,640 A | 9/1988 | Sato | ........................... | 345/574 |
| 5,113,493 A * | 5/1992 | Crosby | ........................ | 345/473 |
| 5,247,353 A * | 9/1993 | Cho et al. | ................ | 348/431.1 |
| 5,463,422 A | 10/1995 | Simpson et al. | ......... | 348/390.1 |
| 5,519,436 A * | 5/1996 | Munson | ................... | 348/14.15 |
| 5,689,483 A | 11/1997 | Ikeda | .......................... | 369/32 |
| 5,724,106 A | 3/1998 | Autry et al. | ................ | 348/734 |
| 5,729,295 A * | 3/1998 | Okada | ................... | 375/240.13 |
| 5,742,272 A | 4/1998 | Kitamura et al. | ........... | 345/667 |
| 5,754,022 A | 5/1998 | Uehara et al. | .............. | 318/474 |
| 5,808,682 A * | 9/1998 | Okunoki et al. | ....... | 375/240.01 |
| 5,877,741 A * | 3/1999 | Chee et al. | ................ | 345/629 |
| 5,990,860 A * | 11/1999 | Takeuchi | .................... | 345/667 |
| 6,204,887 B1 * | 3/2001 | Hiroi | .......................... | 348/565 |
| 6,313,863 B1 * | 11/2001 | Chida | ...................... | 348/14.01 |
| 6,529,214 B1 * | 3/2003 | Chase et al. | ................ | 715/744 |

FOREIGN PATENT DOCUMENTS

EP 0 593 012 A2 4/1994

(Continued)

OTHER PUBLICATIONS de Lange, Alfons A.J., et al. "Low Cost Display-memory Architectures for Multi-window Full-motion Video and Graphics", SPIE, vol. 2188, pp. 336-349, XP-008012613, Feb. 8, 1994.

(Continued)

*Primary Examiner*—Andrew W. Johns
*Assistant Examiner*—Patrick Edwards

(57) ABSTRACT

An image processing apparatus which is capable of displaying moving images with more actions for longer period of time. The apparatus is equipped with: an image data ROM 6 which stores a plurality of static image information and moving image information that includes a plurality of element static image information each of which has less amount of information than that of an static image information; and a graphic device 7 that reads static and moving image information from the image data ROM 6 and performs image processing.

6 Claims, 6 Drawing Sheets

FOREIGN PATENT DOCUMENTS

| | | |
|---|---|---|
| JP | 60-143388 | 7/1985 |
| JP | 01055468 | 3/1989 |
| JP | 03241573 | 10/1991 |
| JP | 09-083882 | 3/1997 |
| JP | 10-74370 | 3/1998 |
| JP | 10-324470 | 12/1998 |
| JP | 2000-187850 | 7/2000 |
| WO | 98/48342 | 10/1998 |

OTHER PUBLICATIONS

Westerink, Joyce H.D.M., et al. "Perceived Sharpness in Moving Images", SPIE, Human Vision and Electronic Imaging: Models, Methods, and Applications, vol. 1249, pp. 78-87, XP-002227605, Feb. 12, 1990.

* cited by examiner

FIG. 3A

| X | Y |
|---|---|
| a | b |

SZ

FIG. 3B

| No. | R | G | B |
|---|---|---|---|
| 0 | $r_0$ | $g_0$ | $b_0$ |
| 1 | $r_1$ | $g_1$ | $b_1$ |
| ⋮ | | | |

P

FIG. 3C

| DOT NO. | COLOR PALLET DATA NO. |
|---|---|
| 0 | 0 |
| 1 | 1 |
| ⋮ | ⋮ |

FIG. 3D

| | | | |
|---|---|---|---|
| | (480) | (240) | (0) |
| | (481) | (241) | (1) |
| | (482) | (242) | (2) |
| | (483) | (243) | (3) |

GD

METHOD AND APPARATUS FOR PROCESSING BOTH STATIC AND MOVING IMAGES

BACKGROUND OF THE INVENTION

1. Field of the Invention

This invention relates to the technical field of image processing. To be more specific, the invention relates to an image processing apparatus that generates processed image information in order to display static and moving images used to select functions in a data processing apparatus.

2. Description of the Related Art

In recent years, function selecting processing arrangements, for instance, which involve selecting a source of audio information or a place to which the audio data is output is carried out with a required selection screen displayed in a display apparatus such as a TV monitor, the operation has been made more interesting by displaying plural kinds of static images which are displayed so that a user can select the function. These static images are connected to each other with related moving images displayed by transmitting a plurality of frames of static images to result in an animation effect when viewed in series.

In the conventional function selecting processing, static images and moving images to be displayed are predetermined in accordance with the function selected in each data processing device, so that both static image information and moving image information for generating appropriate static and moving images are recorded in a recording media such as a ROM (Read Only Memory). Then, each static image and moving image information is read as required to generate corresponding static and moving images that are to be displayed in the display apparatus.

Also, in the conventional data processing apparatus, the amount of static image information for displaying the static image and that of element static data for displaying static images that comprises the moving image (hereafter static image that comprises moving image are referred to as element static image) are supposed to be the same. Concretely, the amount is 240 dots wide by 400 dots high.

However, in the case of aforementioned conventional image display, since the amount of data for the static images and that for the element static images are equal, the element static image information required to be read swiftly and successively can not be read swiftly. Concretely, it took approximately 100 millisecond to read data equivalent to 240 dots wide by 400 dots high from the recording medium. Therefore, there is a problem that the motions in the moving images displayed are awkward since the speed of transmitting frames of processed element static image to generate moving image is reduced.

Moreover, there is another problem in that a sufficient amount of element static image data required to display motions in the moving images more clearly and closely can not be stored in a recording medium having limited storage capacity.

SUMMARY OF THE INVENTION

The present invention has been made in consideration of the foregoing problem. An object of the present invention is to provide an image processing apparatus and method that are capable of displaying moving images with more motions by swiftly reading static image information and element static image information which are recorded in the same recording medium, and of displaying moving images longer period of time by recording larger amount of element static information.

The above object of the present invention can be achieved by an image processing apparatus for processing static image information and moving image information stored in an image information storing device in accordance with the present invention. The apparatus includes: the image information storing device such as ROM for storing a plurality of the static image information, and a plurality of the moving image information comprising a plurality of the element static image information each having the amount that is less than that of one static image information; and an image processing device for reading the static image information and the moving image information from the image information storing device to perform image processing and generate processed image information to be displayed.

According to the apparatus of the present invention, in the image information storing device, a plurality of the static image information, and a plurality of the moving image information are stored. A plurality of the moving image information is provided with a plurality of the element static image information each having the amount that is less than that of one static image information. Then, the image processing device reads the static image information and the moving image information from the image information storing device to perform image processing, and generate processed image information to be displayed.

Therefore, the apparatus makes it possible to perform image processing by reading the moving image information from the image information storing device at high speed since the amount of the element static image information comprising the moving image information is less than that for other static image information. Also, more moving image information can be stored in the image information storing device since the amount of the element static image information is smaller than that of the static image information. As a result the moving image with more actions can be displayed for longer period of time.

In one aspect of the apparatus of the present invention, the image the image processing device enlarges the element static image information and generates the processed image information.

According to this aspect, the element static image information whose amount of the element static image information is smaller than that of the static image information is enlarged to generate the processed image information, so that the static image corresponding to the static image information and the moving image corresponding to the moving image information have the equal size of image, which makes the display easy to see.

In another aspect of the apparatus to the present invention, the apparatus further comprises a determining device for determining whether the static image information is being read or the moving image information is being read from the image information storing device. Then, the image processing device generates the processed image information without enlarging the static image information when the determining device determines that the static image information is being read, and generates the processed image information by enlarging the element static image information when the determining device determines that the moving image information is being read.

According to this aspect, it is possible to display the static image and the moving image with the equal size of image, which is easy to see.

In another aspect of the apparatus of the present invention, the static image corresponding to the static image information is a static image used for selecting functions in an information processing apparatus including the image processing apparatus. Further, the moving image corresponding to the moving image information is displayed while one static image corresponding to one static image information is being changed to another static image corresponding to another static image information.

According to this aspect, a plurality of the static images used for selecting functions is displayed so as to be connected with the moving images so that the static and moving images are displayed as if they were an continual animation, thus function selecting can be fascinating to users.

The above object of the present invention can be achieved by an image processing method of processing static image information and moving image information stored in an image information storing device in accordance with the present invention. The method is provided with: the process of storing a plurality of the static image information, and a plurality of the moving image information comprising a plurality of the element static image information each having the amount that is less than that of one static image information, in the image information storing device; the process of reading the static image information and the moving image information from the image information storing device to perform image processing; and the process of generating processed image information to be displayed.

According to the method of the present invention, a plurality of the static image information, and a plurality of the moving image information comprising a plurality of the element static image information each having the amount that is less than that of one static image information are stored in the image information storing device. Then, the static image information and the moving image information is read from the image information storing device to perform image processing. Further, processed image information to be displayed is generated.

Therefore, the method makes it possible to perform image processing by reading the moving image information from the image information storing device at high speed since the amount of the element static image information comprising the moving image information is less than that for other static image information. Also, more moving image information can be stored in the image information storing device since the amount of the element static image information is smaller than that of the static image information. As a result the moving image with more actions can be displayed for longer period of time.

In one aspect of the method of the present invention, toe process of generating the processed image information enlarges the element static image information and generates the processed image information.

According to this aspect, the element static image information whose amount of the element static image information is smaller than that of the static image information is enlarged to generate the processed image information, so that the static image corresponding to the static image information and the moving image corresponding to the moving image information have the equal size region for display, which makes the display easy to see.

In another aspect of the method of the present invention, the method further comprises the process of determining whether the static image information is being read or the moving image information is being read from the image information storing device. Then, the process of generating the processed image information generates the processed image information without enlarging the static image information when the determining device determines that the static image information is being read, and generates the processed image information by enlarging the element static image information when the determining device determines that the moving image information is being read.

According to this aspect, it is possible to display the static image and the moving image with equal display regions, which is easy to see.

In another aspect of the method of the present invention, the static image corresponding to the static image information is a static image used for selecting functions in an information processing apparatus where the image processing is performed; and the moving image corresponding to the moving image information is displayed while one static image corresponding to one static image information is being changed to another static image corresponding to another static image information.

According to this aspect, a plurality of the static images used for selecting functions is displayed so as to be connected with the moving images so that the static and moving images are displayed as if they were an continual animation, thus function selecting can be fascinating to users.

BRIEF DESCRIPTION OF THE DRAWINGS

FIG. 3A is a diagram showing an actual example of size data;

FIG. 3B is a diagram showing an actual example of color palette data;

FIG. 3C is a diagram showing an actual example of an actual examples of image data;

FIG. 3D is a diagram showing an actual example of dot numbers in an image;

DESCRIPTION OF THE PREFERRED EMBODIMENT

Referring to FIGS. 1 to 6, preferred embodiments of the present invention will now be described.

The preferred embodiment described below is an embodiment in which the present invention is applied to an image processing apparatus that outputs both static and moving images as selection images for performing the function selecting processing in an audio equipment installed on vehicles as an information processing apparatus.

Figure 1:
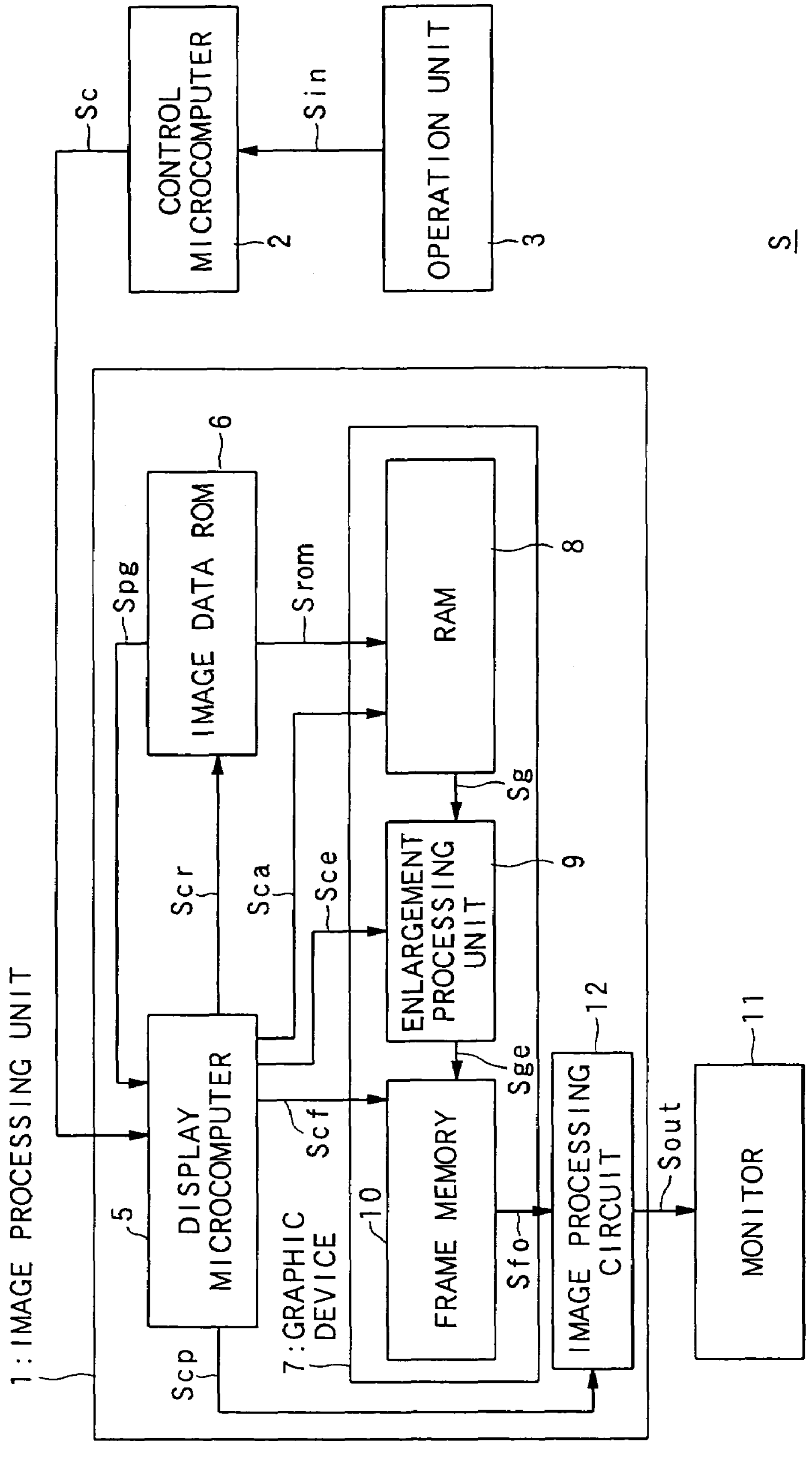
FIG. 1 is a block diagram showing the outline structure of the image processing apparatus in the preferred embodiment.
Figure 2:
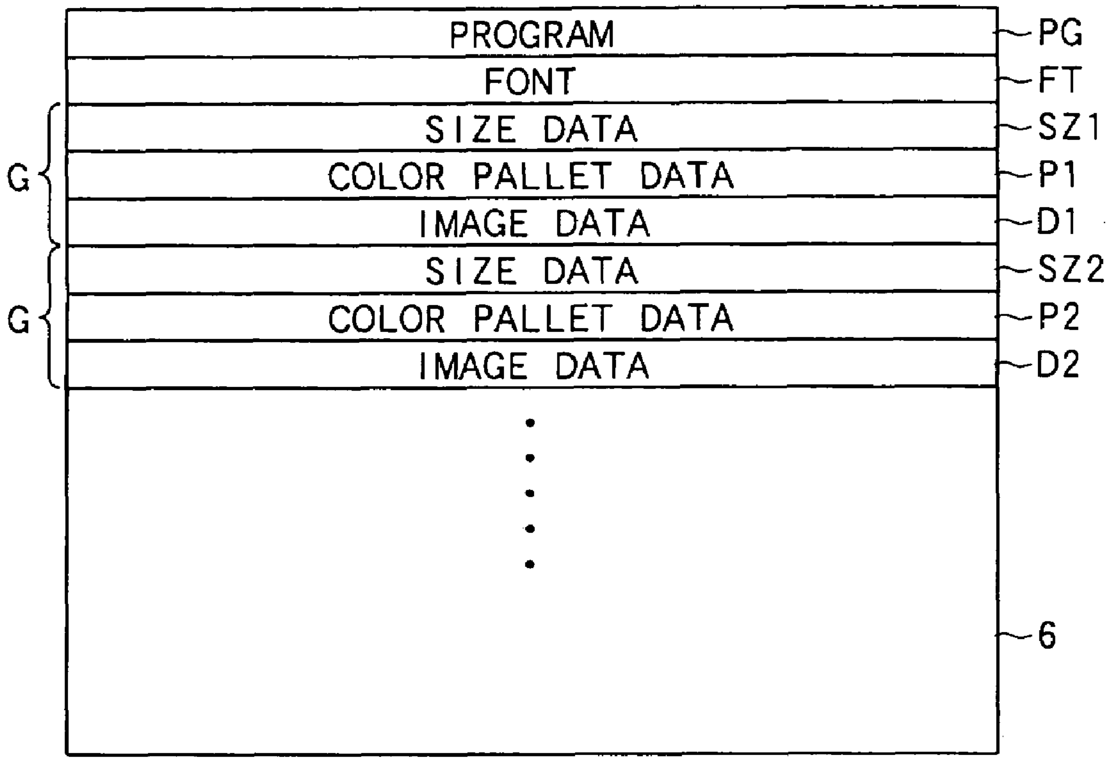
FIG. 2 is a diagram showing the structure of an image data ROM.
Figure 4:
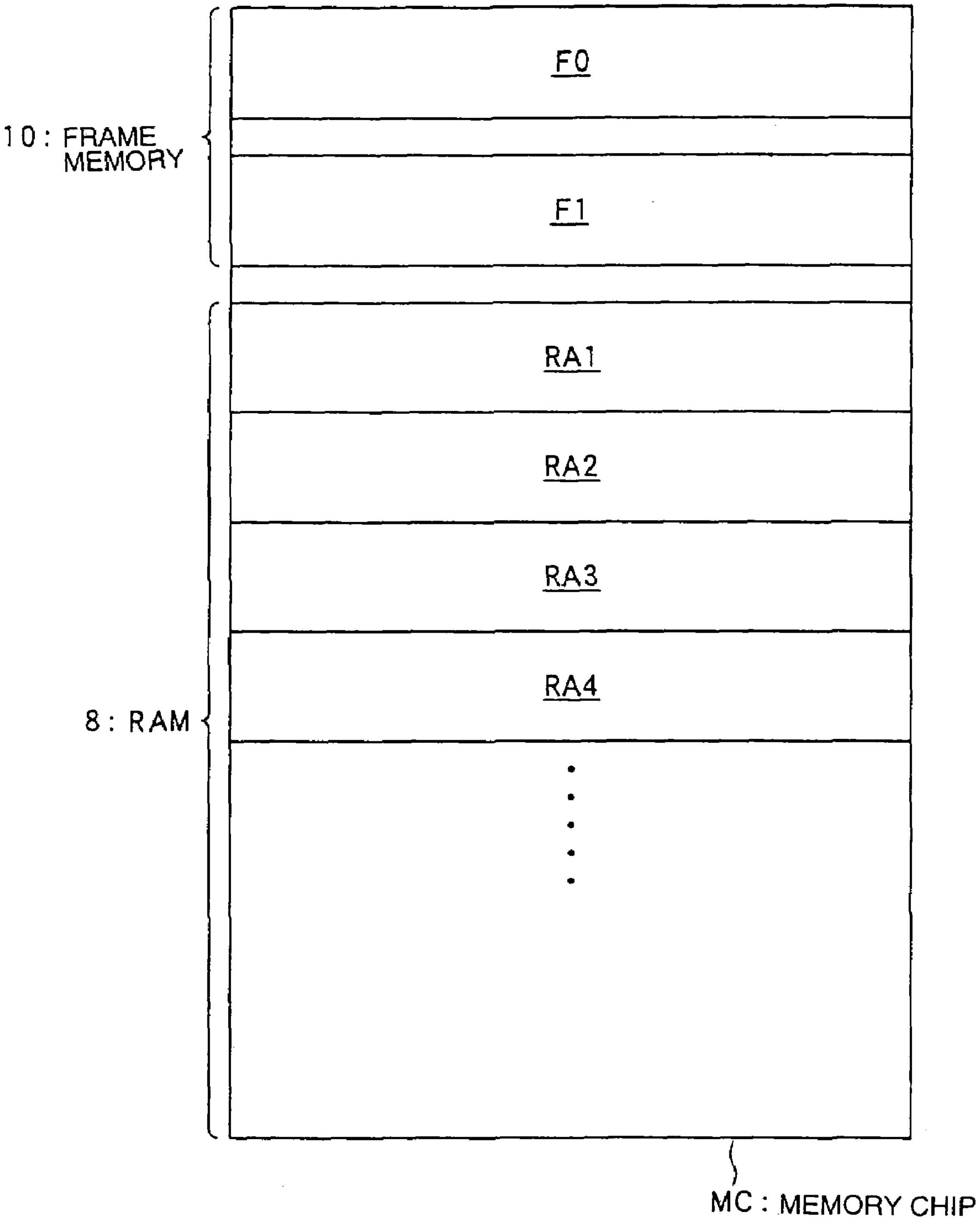
FIG. 4 is a diagram showing the structure of each memory.
Figure 5:
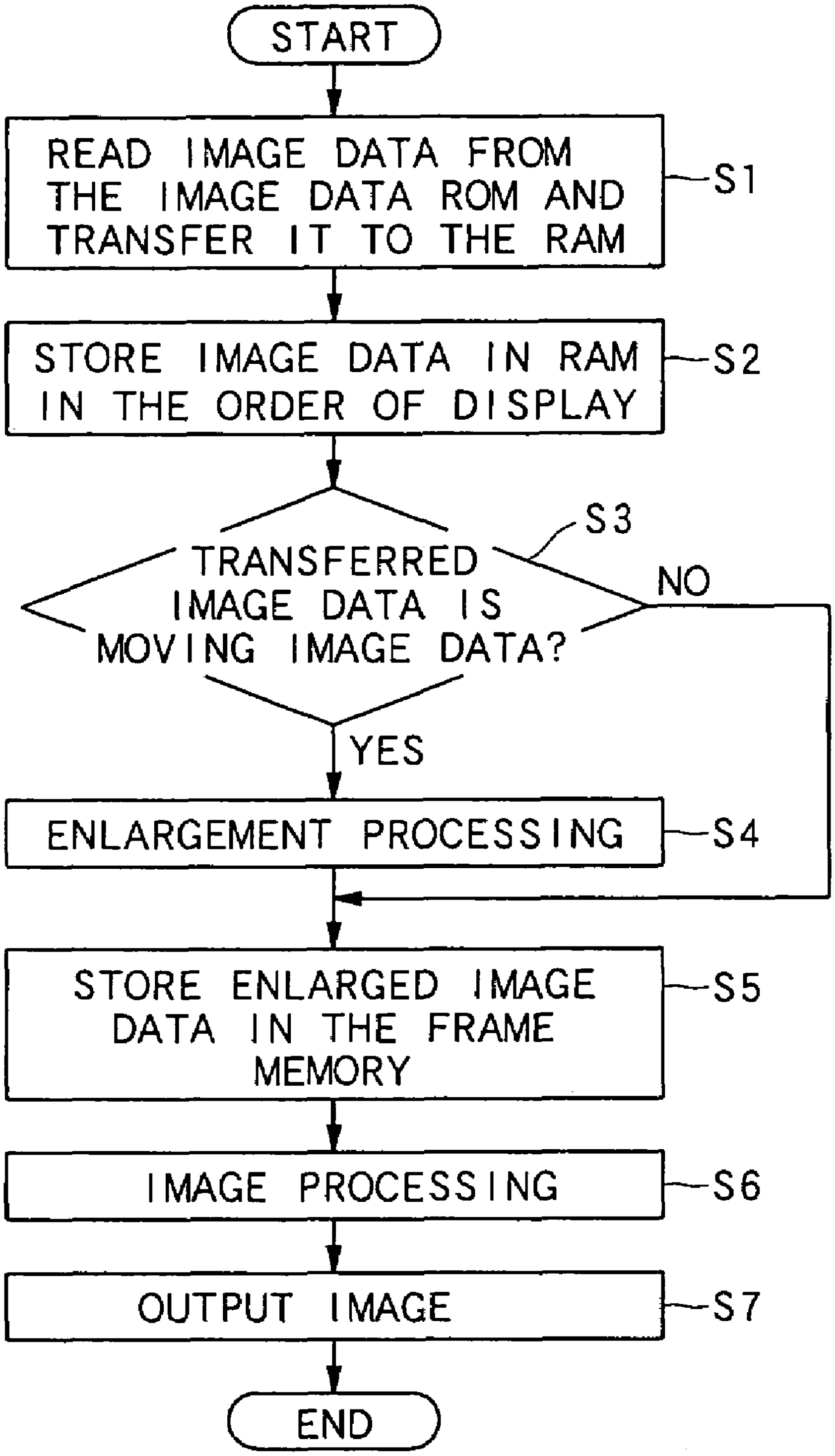
FIG. 5 is a flow chart showing image processing in the preferred embodiment.

FIG. 1 is a block diagram that shows outlined configuration of the image processing apparatus in the preferred embodiment. FIG. 2 is a diagram that shows the structure of an image data ROM. FIGS. 3A–3D are diagrams that shows each data comprising image information in detail. FIG. 4 is a diagram that shows the structure of each memory. FIG. 5 is a flow chart that shows image processing in the preferred embodiment. FIG. 6 is a diagram that shows an actual example of image displaying.

As shown in FIG. 1, an image processing apparatus S in the present embodiment is provided with: an image processing unit 1 which takes a leading part in carrying out image processing in the present embodiment; a control microcomputer 2 which controls the image processing unit 1; an operation unit 3 comprising a remote controller for remote operation of functions and so on in the image processing unit S or a switch attached to the image processing unit S; and a monitor 11 which displays static and moving images generated in the image processing unit 1.

The image processing unit 1 is provided with: a display microcomputer 5 as a determining device; an image data ROM 6 as an image data storing device; a graphic device 7 as a processing device; and an image processing circuit 12.

The graphic device 7 is provided with: a RAM (Random Access Memory) 8 which stores static and moving images to be displayed in the monitor 11 arranged in the order of display; an enlargement unit 9 as a processing device; and a frame memory 10.

In FIG. 1, only a portion relating to image processing in the information processing apparatus of the present embodiment is described. However, an actual information processing apparatus includes others such as a data reproducing unit to reproduce audio data recorded in CD (Compact Disc), a speaker to output the reproduced audio data, etc., or a tuner to receive radio wave. In the function selection processing, processing to select the source of data or the place where data is outputted or to select and control output level for each frequency is carried out.

The operation of each constituent element in the image processing unit S will be described.

First of all, a user operates the image processing apparatus S to carry out function selecting processing in the operation unit 3, and operation signal Sin corresponding to the operation is generated and outputted to the control microcomputer 2.

As a result, the control microcomputer 2 generates control signal Sc to control the image processing unit 1 in response to the operation inputted as the operation signal Sin and outputs it to the display microcomputer 5 in the image processing unit 5.

Meanwhile, the image data ROM 6 in the image processing unit 1 stores: a plurality of element static image information that constitute moving image information corresponding to the moving image displayed in the monitor 11 during the function selecting processing; static image information that corresponds to the static image displayed in the monitor 11 during the function selecting processing; a program provided for image processing in the embodiment in the display microcomputer 5; and a font (character style) for display used in the function selecting processing.

Then, the image data ROM 6 stores the program PG, the font FT, and a plurality of image information G, each of which is either the element static image information or the static image information, as shown in the FIG. 2.

In addition, the image information G is stored in the image data ROM 6 as many as the number of element static image information and the static image information. One image information G includes: size data SZ which represents the number of dots on X (vertical) direction and those on Y (horizontal) direction of either element static image information or static image information; color pallet data P which represents color schemes in either element static image information or static image information by 256 colors (8 bits) using R (Red), G (Green), and B (Blue); and image data D which represents data of either element static image information or static image information actually displayed in the monitor 11.

Each data comprising the image information G will be described concretely using FIG. 3.

First, the size data SZ, as shown in FIG. 3A, includes the number of dots X ("a" dots in FIG. 3A) in vertical direction and the number of dots Y ("b" dots in FIG. 3A) in horizontal direction.

Then, color Pallet Data P, as shown in FIG. 3B, includes each mixture ratio of R, G, and B by pallet number in the color pallet. In the case shown in FIG. 3B, the mixture ratio for pallet 0 is "r0:g0:b0" and "r1:g1:b1" for pallet 1.

Also, as shown in FIG. 3C, the dot number and the pallet number to indicate the color of the dot corresponding to each dot number is stored in the image data ROM 6 for an image, either static image or element static image, as image data D. At this time, the dot number is assigned, as shown in FIG. 3D, in the ascending order in accordance with the size data SZ from the top dot on the right in image GD.

A dot having the dot number 0 in the image GD shown in FIG. 3D, for instance, is colored by the color of the pallet number 0 shown in FIG. 3C in accordance with each data as the image data G. Further, the mixture ratio of each primary color for the pallet number 0 should be "r0:g0:b0".

On the other hand, the amount of information for each unit of one image in the case of element static image information and static image information stored is described as 200 dots by 78 dots for element static image information and 400 dots by 240 dots for static image information. And image information G corresponding to 1609 images is stored in the image data ROM 6.

The memory capacity of the image data ROM 6 as a whole is described as 1.53 megabytes. Element static image information corresponding to approximately 100 images is stored in the image data ROM 6.

The program PG is outputted to the display microcomputer 5 as a program signal Spg in accordance with a requesting signal from the the display microcomputer 5. The display microcomputer 5 carries out image processing of the embodiment described below in accordance with the program.

The Image data ROM 6 outputs the image data D and the color pallet data P assigned in accordance with the size data SZ as an image signal Srom to the RAM 8. The image data D and the color pallet data P is assigned from image data G (either element static image data or static image data) designated by a control signal Scr generated in the display microcomputer 5 based on a control signal Sc from the control microcomputer 2.

Then, the RAM 8 temporarily stores image information (concretely, color pallet data P and image data D) outputted from the image data ROM 6 as the image signal Srom in a separate region per an image unit. The RAM 8 also outputs the image information designated by a control signal Sca from the display microcomputer 5 as an image signal Sg per the image unit to the enlargement processing unit 9. At this time, the RAM 8 stores and outputs image information similarly to so-called FIFO (First In First Out) memory.

As a result, the enlargement processing unit 9 carries out enlargement processing for the element static image information in accordance with the control signal Sce from the display microcomputer 5 when the image information outputted as the image signal Sg from the RAM 8 is the element static image information. The enlargement processing is carried out so that the size of an image corresponding to the one image unit of the element static information becomes equivalent to the size of the image of the one image unit of the static image information. Then, the enlargement processing unit 9 outputs the enlarged element static image information to the frame memory 10 as an image signal Sge.

At this time, the enlargement processing unit 9 executes three-dimensional enlargement processing including modeling processing and rendering processing using so-called polygon for the element static image information to generate the image signal Sge.

Also, the enlargement processing unit 9 generates the image signal Sge including the static image data which is not enlarged to output it to the frame memory 10 without executing the enlargement processing for the static image data when the image information outputted as the image signal Sg from the RAM 8 is the static image information for displaying the static image.

Then, the frame memory 10 stores the outputted image signal Sge per one image unit and outputs image information designated by a control signal Scf from the display microcomputer 5 to the image processing circuit 12 as an image signal Sfo per one image unit.

As a result, the image processing circuit 12 carries out the image processing such as coloring in accordance with the control signal Scp from the display microcomputer 5 using the image information included in the image signal Sfo outputted from the frame memory 10. Then, the image processing circuit 12 outputs the image signal Sout to the monitor 11. Concretely, the image information included in the image signal Sfo is the color palette data P and the image data D. Hereafter, the image information processed as mentioned above by the image processing circuit 12 is referred to as synthesized image information.

Then, the monitor 11 displays an image signal Sout per one image unit. At this time, when the synthesized image information included in the image signal Sout is the static image information, corresponding static information is displayed. On the other hand, when the synthesized image data is the element image information, corresponding moving image is displayed by displaying a plurality of element static image information successively.

Simultaneously, the display microcomputer 5 generates control signals Scr, Sca, Scp Sce, and Scf in accordance with the program PG outputted as the program signal Spg to control the above components and outputs them to each components.

At this time, the control signal Scr, Sca, and Scf includes instruction information indicative of the image information to be outputted out of the image information stored in the corresponding memory.

Next, the structure of the frame memory 10 and the components of the RAM 8 in detail will be described using FIG. 4.

As shown in FIG. 4, the frame memory 10 and the RAM 8 are formed actually on one memory chip MC.

At this time, the frame memory 10 is equipped with regions F0 and F1 corresponding to one image unit respectively. The image information processed by the image processing circuit 12 to be displayed as the synthesized image information in the monitor 11 are stored in the regions F0 and F1 respectively. In other words, partly enlarged image information outputted as the image signal Sg from the RAM 8 are stored in the regions F0 and F1 respectively. The partly enlarged image information is either the static image information or the enlarged element static image information.

After the image processing for the image information stored in the region F0 terminates in the image processing circuit 12, the image information stored in the region F1 is processed in the image processing circuit 12 while the processed image information stored in the region F0 is displayed in the monitor 11 as the synthesized image information.

The RAM 8 includes regions RA1, RA2, RA3, RA4, and so on corresponding to one image unit respectively. The image information partly enlarged and outputted as the image signal Srom from the image data ROM 8 are stored in the regions RA1, RA2, RA3, RA4, etc. in the order of output to the frame memory 10 as the image signal Sg.

Then, the image processing in the present embodiment mainly performed in the display microcomputer 5 will be described using FIG. 5.

A program corresponding to the flowchart shown in FIG. 5 is stored in the image data ROM 6 in advance as the program PG. The image processing of the present embodiment is carried out by the display microcomputer 5 which reads the program.

As shown in FIG. 5, first of all, the image information G is read from the image data ROM 6 (Step S1). Then, the image data D and the color pallet data P assigned in accordance with the size data SZ included in the image information G is transferred to the RAM 8 in the image processing of the present embodiment (Step S1). At this time, image information transferred from the image data ROM 6 (the color pallet data P and the image data D) is loaded in the frame memory 10 in the order of transfer from the region RA1 in the RAM 8 (Step S2.)

The image data loaded in the region RA1 shown in FIG. 4 is the image information displayed in the monitor 11 earlier than any other image information stored in the RAM 8. The next one to be displayed in the monitor 11 is loaded in the region RA2.

Address numbers to indicate the order of transfer to the frame memory 10 can be provided to each region in the RAM 8 although it is not shown in FIG. 4. In this case, the image information loaded in the region with smallest number ("1", for instance) is the image information to be displayed in the monitor 11 earlier than any other image information stored in the RAM 8.

Then, it is determined whether transferred image information is the element static image information to display the moving image (Step S3). If it is not the element static image information (Step S3: No), the image information transferred to the RAM 8 is regarded as the static image information. The processing described in Step 5 is will be performed. On the other hand, if the transferred image information is the element static image information (Step S3: Yes), the enlargement processing unit 9 executes the enlargement processing for the element static image information (Step S4). Then, the enlarged element static image information is stored in the region of either F0 or F1 whichever is available in the frame memory 10 (Step S5).

The image information stored in each region in the RAM 8 is transferred to the region of either F0 or F1, which became available, in accordance with the order of being transferred after either of the image information data stored in the region of either F0 or F1 in the frame memory 10 is output.

Then, for the loaded element image information (Step S3; Yes) or the static image information (Step S3; No), the image processing such as coloring processing is carried out at a timing corresponding to each information using the processing circuit 12 (Step S6). The processed information is outputted to the monitor 11 as the synthesized image information (Step S7), and a series of image processing is terminated.

Next, image displayed as a result of the series of image processing for the purpose of function selecting will be described with reference to FIG. 6.

As for the function selecting in the embodiment, each processing of function selecting processing is performed using a static image corresponding to the static image information. However, when one function selecting processing is switched over to another, a static image corresponding to the one function selecting processing and another static image corresponding to another function selecting processing are connected with successive moving image which comprises a plurality of consecutive element static image information.

Figure 6A:
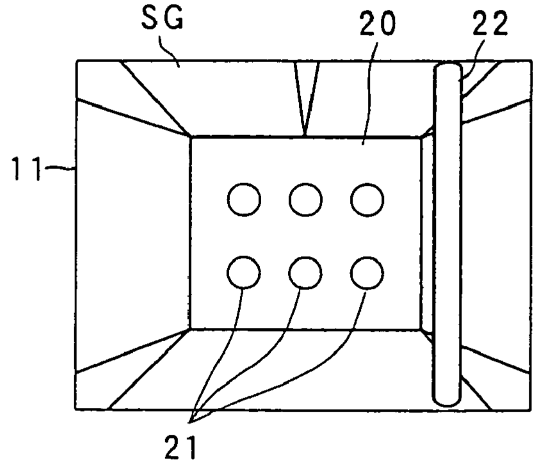
FIG. 6 is a diagram showing an actual example of image displaying.
Figure 6B:
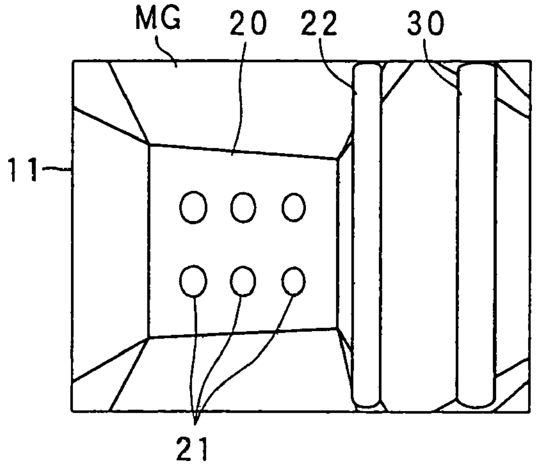
Figure 6C:
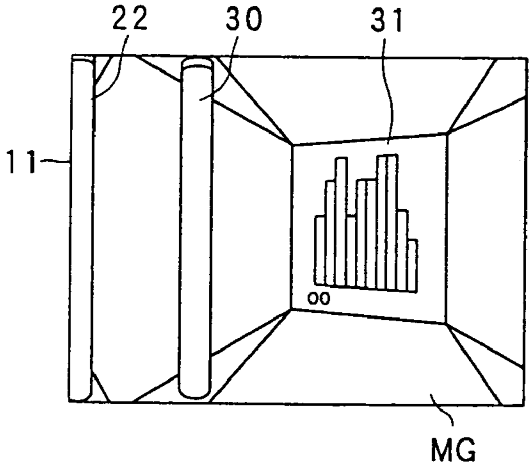
Figure 6D:
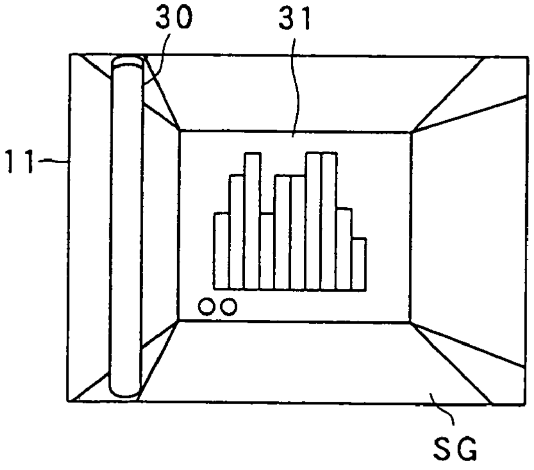

In other words, first of all, a static image SG for function selecting including a function selection button 21, a function selection panel 20, and the decoration pole 22 as shown in FIG. 6A is displayed in the monitor 11 and corresponding function selecting processing is executed. Then, when the function selecting processing is switched over to another, the static image SG shown in FIG. 6A is switched over to moving image MG shown in FIG. 6B including a pole 30 for the decoration that is to be included in the static image corresponding to other function selecting processing together with the function selection button 21, the function selection panel 20, the decoration pole 22. Further, moving image MG shown in FIG. 6B goes on to moving image MG shown in FIG. 6C with a function selection panel 31 which is to be included in the static image corresponding to the other function selecting processing together with the pole 22 and 30. Finally, the function selection panel 31 and the pole 30 is displayed in the monitor 11 as static image SG shown in FIG. 6D corresponding to the other function selecting processing.

At this time, the images shown in FIGS. 6A to 6D continuously move as if the user is moving his eyes in the right-ward direction, that is, as if the images move towards the left.

As described above, since the amount of the stored element static image information, which the moving information comprises, stored in the image data ROM 6 is less than that of static image information stored in the image data ROM 6, the image processing in the embodiment makes it possible to read the moving image information at a high speed from the image data ROM 6 to carry out image processing.

To be more specific, the amount of the element static image information which is reduced to that of 200 dots by 78 dots makes it possible to reduce the speed of reading the data from the image data ROM 6 from approximately 100 milliseconds to 17 milliseconds.

Also, more moving image information can be stored in the image data ROM 6 since the amount of the element static image information is less than that of the static image information.

In addition, when it is determined that a static image information is being read from the image data ROM 6, the read static image information is not enlarged, but when it is determined that the moving image information is being read from the image data ROM 6, the element static image information in the read moving image information is enlarged so that the static and moving images are displayed in the equal size of image, which is easy to see.

Also, the static and moving images are displayed like a continuous animation since a plurality of the static and moving images used for function selecting processing are displayed as if they were connected, so that the operation of function selecting is carried out in a way that results in the display being interesting for a user to observe.

The invention may be embodied in other specific forms without departing from the spirit or essential characteristics thereof. The present embodiments are therefore to be considered in all respects as illustrative and not restrictive, the scope of the invention being indicated by the appended claims rather than by the forgoing description and all changes which come within the meaning and range of equivalency of the claims are therefore intended to be embraces therein.

The entire disclosure of Japanese Patent Application No. 2000-9 9900 filed on Mar. 31, 2000 including the specification, claims, drawings and summary is incorporated herein by reference in its entirety.

What is claimed is:

1. An image processing apparatus for processing static image information and moving image information stored in an image information storing device, comprising:

the image information storing device for storing a plurality of the static image information, and a plurality of the moving image information comprising a plurality of the element static image information each having the amount that is less than that of one static image information;

an image processing device for reading the static image information and the moving image information from the image information storing device to perform image processing and generate processed image information to be displayed; and a determining device for determining whether the static image information is being read or the moving image information is being read from the image information storing device, wherein the image processing device generates the processed image information without enlarging the static image information when the determining device determines that the static image information is being read, and generates the processed image information by enlarging the element static image information when the determining device determines that the moving image information is being read, wherein the static image corresponding to the static image information is a static image used for selecting functions in an information processing apparatus including the image processing apparatus; and the moving image corresponding to the moving image information is displayed while one static image corresponding to one static image information is being changed to another static image corresponding to another static image information, wherein moving image is connected between said one static image and said another static image.

2. The image processing apparatus according to claim 1, wherein the image processing device performs image processing so that the static image information and the moving image information are sequentially displayed.

3. The image processing apparatus according to claim 1, wherein the image processing device performs image processing so that the size of an image corresponding to the element static image information becomes equivalent to the size of an image corresponding to the static image information.

4. An image processing method of processing static image information and moving image information stored in an image information storing device, comprising the processes of:

storing a plurality of the static image information, and a plurality of the moving image information comprising a plurality of the element static image information each having the amount that is less than that of one static image information;

reading the static image information and the moving image information from the image information storing device to perform image processing and generate processed image information to be displayed; and determining whether the static image information is being read or the moving image information is being read from the image information storing device, wherein the process of generating the processed image information generates the processed image information without enlarging the static image information when the determining device determines that the static image information is being read, and generates the processed image information by enlarging the element static image information when the determining device determines that the moving image information is being read, wherein the static image corresponding to the static image information is a static image used for selecting functions in an information processing apparatus where the image processing is performed; and the moving image corresponding to the moving image information is displayed while one static image corresponding to one static image information is being changed to another static image corresponding to another static image information, wherein moving image is connected between said one static image and said another static image.

5. The image processing method according to claim 4, wherein the image processing is performed so that the static image information and the moving image information are sequentially displayed.

6. The image processing method according to claim 4, wherein the image processing is performed so that the size of an image corresponding to the element static image information becomes equivalent to the size of an image corresponding to the static image information.

* * * * *